(12) United States Patent
Ito

(10) Patent No.: US 11,314,810 B2
(45) Date of Patent: Apr. 26, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yasushi Ito, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 334 days.

(21) Appl. No.: 16/516,799

(22) Filed: Jul. 19, 2019

(65) Prior Publication Data
US 2020/0218765 A1 Jul. 9, 2020

(30) Foreign Application Priority Data

Jan. 9, 2019 (JP) .............................. JP2019-001851

(51) Int. Cl.
*G06F 40/53* (2020.01)
*G10L 17/00* (2013.01)
*G06F 16/9032* (2019.01)
*G10L 17/20* (2013.01)
*G10L 15/32* (2013.01)

(52) U.S. Cl.
CPC ........ *G06F 16/90332* (2019.01); *G10L 15/32* (2013.01); *G10L 17/20* (2013.01)

(58) Field of Classification Search
CPC .............. G06F 40/242; G06F 16/3344; G06F 16/90332; G06F 17/27; G10L 15/32; G10L 17/20; G10L 15/04; G10L 15/063
See application file for complete search history.

(56) References Cited

U.S. PATENT DOCUMENTS

| 6,065,001 A * | 5/2000 | Ohkubo ................. G06F 16/355 707/700 |
| 8,825,648 B2 * | 9/2014 | Ni .......................... G06F 40/284 707/737 |
| 10,019,514 B2 * | 7/2018 | Elisha .................. G06F 16/3344 |
| 2009/0055381 A1 * | 2/2009 | Wu ........................ G06F 40/258 |
| 2011/0137921 A1 * | 6/2011 | Inagaki ............... G06F 16/3347 707/749 |

(Continued)

FOREIGN PATENT DOCUMENTS

| JP | 2013-109125 A | 6/2013 |
| JP | 2015034902 A * | 2/2015 |
| JP | 2015215390 A * | 12/2015 |

*Primary Examiner* — Olujimi A Adesanya
(74) *Attorney, Agent, or Firm* — Oliff PLC

(57) ABSTRACT

An information processing apparatus includes: a receiver configured to receive an utterance content of a speaker, a processing structure of a work in which the speaker utters, the work including plural processing units, and a processing unit in execution in the processing structure; an extraction unit configured to extract a related document including a sentence whose similarity to the utterance content of the speaker received by the receiver is equal to or higher than a threshold, from among related documents that are associated in advance with at least one processing unit including the processing unit in execution received by the receiver; and a setting unit configured to set a processing unit from which the extraction unit extracts a related document next, according to the processing structure received by the receiver.

13 Claims, 8 Drawing Sheets

(56) References Cited

U.S. PATENT DOCUMENTS

| | | | |
|---|---|---|---|
| 2015/0112683 A1* | 4/2015 | Fujii | G10L 15/1822 704/254 |
| 2015/0370784 A1* | 12/2015 | Nissan | G06F 40/247 704/2 |
| 2016/0103835 A1* | 4/2016 | Zupancic | G06F 16/24578 707/749 |
| 2017/0011480 A1* | 1/2017 | Morimoto | G06Q 10/107 |
| 2018/0067920 A1* | 3/2018 | Cho | G10L 15/063 |
| 2020/0020321 A1* | 1/2020 | Nakamura | G06F 40/268 |

\* cited by examiner

| PRIORITY | FILTER CONDITION |
|---|---|
| 1 | TASK IN WHICH SAME SPEAKER AND SAME PERSON IN CHARGE AS TASK IN EXECUTION ARE INVOLVED |
| 2 | TASK IN WHICH SAME SPEAKER AS TASK IN EXECUTION IS INVOLVED |
| 3 | TASK IN WHICH SAME PERSON IN CHARGE AS TASK IN EXECUTION IS INVOLVED |
| ⋮ | ⋮ |

16

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-001851 filed Jan. 9, 2019.

BACKGROUND (i) Technical Field

The present disclosure relates to an information processing apparatus and a non-transitory computer readable medium.

(ii) Related Art

JP-A-2013-109125 discloses a word addition device including a recognition result storage unit in which a recognition result of voice recognition of input speech is stored, a related document storage unit that stores the related document related to a task of the input voice, a recognition dictionary storage unit that stores recognition dictionary, an extended recognition dictionary storage unit that stores an extended recognition dictionary in which additional registration words are added to the recognition dictionary, an unregistered word storage unit that stores unregistered words not registered in the recognition dictionary, an unregistered word extraction unit that extracts the unregistered word from the related document using the recognition dictionary, an unregistered word feature extraction unit that generates a co-occurrence frequency vector characterizing the unregistered word from the unregistered word and the related document, a recognition result feature quantity extraction unit that generates a word frequency vector that characterizes the recognition result from the recognition result, a task relevance calculation unit configured to calculate a task relevance for each unregistered word from the co-occurrence frequency vector and the word frequency vector, an unregistered word frequency calculation unit that calculates an unregistered word frequency that is an appearance frequency of the unregistered word in the related document from the unregistered word and the related document, a registration priority calculation unit that calculates registration priority for each of the unregistered words from the task relevance and the unregistered word frequency, and a recognition dictionary registration unit that extracts the additional registration word from the unregistered word and the registration priority using a preset threshold value, adds the additional registration word to the recognition dictionary, and generates the extended recognition dictionary.

In a case of collecting the vocabularies used for voice recognition, since a feature of each vocabulary is found in the tendency of the vocabulary used, the vocabulary used for voice recognition may be extracted as a document associated with a scene from a related document previously associated with each scene.

However, in this case, since a target from which vocabularies are to be extracted is limited to the related document associated with the scene for voice recognition in advance, the vocabularies are not extracted from other than the related document associated with the scene in advance even when a limited range of vocabularies is included in the related documents.

SUMMARY

Aspects of non-limiting exemplary embodiments of the present disclosure relate to an information processing apparatus and a non-transitory computer readable medium capable of efficiently collecting vocabularies according to a scene as compared with a case of extracting vocabularies to be used for voice recognition only from a predetermined related document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a receiver configured to receive an utterance content of a speaker, a processing structure of a work in which the speaker utters, the work including plural processing units, and a processing unit in execution in the processing structure; an extraction unit configured to extract a related document including a sentence whose similarity to the utterance content of the speaker received by the receiver is equal to or higher than a threshold value, from among related documents that are associated in advance with at least one processing unit including the processing unit in execution received by the receiver; and a setting unit configured to, when the number of vocabularies included in the related document extracted by the extraction unit is equal to or less than a number that is set for the number of vocabularies included in the utterance content of the speaker, set a processing unit from which the extraction unit extracts a related document next, according to the processing structure received by the receiver.

BRIEF DESCRIPTION OF THE DRAWINGS

Exemplary embodiments of the present invention will be described in detail based on the following figures, wherein.

DETAILED DESCRIPTION

Figure 1:
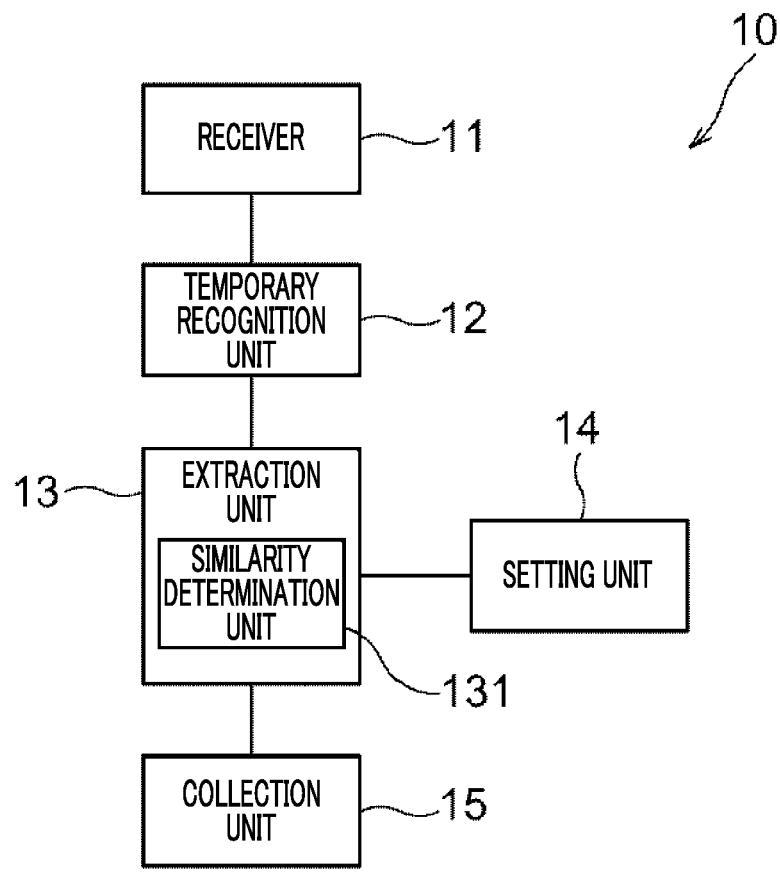
FIG. 1 is a diagram illustrating an example of a functional configuration of an information processing apparatus.

Hereinafter, the present exemplary embodiment will be described with reference to the drawings. Components and processing having the same function will be given the same reference numerals throughout the drawings and redundant description will be omitted.

Exemplary Embodiment

FIG. 1 is a diagram illustrating a functional configuration example of an information processing apparatus 10 that receives voice data uttered by a speaker, collects vocabularies from a document related to a content of the received voice data, and generates a dictionary used for voice recognition. As illustrated in FIG. 1, the information processing apparatus 10 includes a receiver 11, a temporary recognition unit 12, an extraction unit 13, a setting unit 14, and a collection unit 15. The extraction unit 13 further includes a similarity determination unit 131.

A speaker may, for example, convey his or her thoughts, wishes, or the like to another person in order to process something. Here, a matter that is processed along with a conversation will be referred to as "work". For example, at a bank window, a loan business is performed by a person who wants to receive a loan becoming a speaker and having a conversation with a staff member in charge of the loan. In addition, a person who wants to open an account becomes a speaker and requests a staff member in charge to perform an account opening business. Each of such loan business and account opening business is a type of work.

Figure 2:
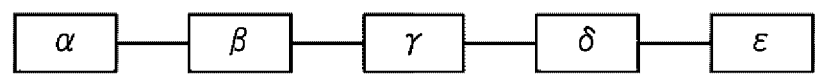
FIG. 2 is a diagram illustrating an example of a processing structure of a work.

FIG. 2 is a diagram illustrating an example of a processing structure of a work. The work includes plural processing units, and is performed by processing each processing unit in a designated order. The work illustrated in FIG. 2 includes five processing units, that is, processing units $\alpha$ to $\epsilon$. The work also represents, for example, that the processing units are processed in order of the processing unit $\alpha$, the processing unit $\beta$, the processing unit $\gamma$, the processing unit $\delta$, and the processing unit $\epsilon$. Hereinafter, the flow of the work represented by the processing structure of the work will be referred to as a "workflow", and each processing unit in the work flow will be referred to as a "task". In addition, the processing structure of the work represented by using tasks will be referred to as a "task structure".

In the case of the loan business, for example, the task $\alpha$ is input processing for registering information on a customer who wants to loan in advance, the task $\beta$ is hearing processing for listening to customers at a window, the task $\gamma$ is survey processing for investigating a customer's creditworthiness, the task $\delta$ is examination processing for determining whether to provide a loan based on the credit investigation result, and the task c is notification processing for notifying the customer of the examination result. The number of tasks included in the workflow and the processing order of the tasks vary depending on works. The work flow illustrated in FIG. 2 is merely an example.

The receiver 11 receives voice data representing the utterance content of the speaker, a task structure of a work in which the utterance is performed, and information indicating the task in a scene in which the speaker utters (which will be referred to as a "task in execution".) As information indicating a task in execution, for example, a task name or an identification number uniquely identifying the task (for example, task identification (ID)) is used. The "task in execution" does not mean that the processing of the task is being performed in real time, but refers to a task received by the receiver 11, that is, a task that is a processing target of the information processing apparatus 10. Therefore, the processing of the task itself is not necessarily being executed at the timing when the receiver 11 receives voice data or the like. Hereinafter, a task in execution may be referred to as a "task in execution".

The receiver 11 stores the received voice data, the workflow, and information indicating the task in execution in the storage device, and notifies the temporary recognition unit 12 of the voice data. When the task structure for each work is stored in a storage device in advance in association with the each work, the receiver 11 may receive a work ID for uniquely identifying a corresponding task structure instead of the task structure of the each work. In this case, the task structure is acquired from the work ID.

When receiving the voice data, the temporary recognition unit 12 converts the voice data into characters using a voice recognition technique of a related art. The temporary recognition unit 12 performs the voice recognition not using a dictionary that collects vocabularies that are more likely to be used by the speaker in processing a task in execution than other tasks, that is, an optimization dictionary optimized for the task, but using a predetermined dictionary to which vocabularies related to the work are not reflected. Therefore, the voice recognition result in the temporary recognition unit 12 may also be referred to as a "temporary recognition result".

The extraction unit 13 extracts a document including a sentence whose similarity to the utterance content of the speaker represented as the temporary recognition result is equal to or higher than a threshold value from among documents associated with the task in execution. In some cases, the extraction unit 13 extracts a document including a sentence whose similarity to the utterance content of the speaker represented as the temporary recognition result is equal to or higher than a threshold value from among the documents associated with the task set by the setting unit 14 (described later). That is, the extraction unit 13 extracts the document including the sentence whose similarity to the utterance content of the speaker is equal to or more than the threshold value from the documents associated with at least one task.

The similarity between the utterance content of the speaker and the related document is determined by the similarity determination unit 131 in the extraction unit 13.

A document associated with each task will be referred to as a "related document" because such a document relates to the each task. The related documents include a document included in a storage region such as a folder associated with a task in advance and a document searched using a specific keyword. Specifically, for example, any documents relating to a task irrespective of types and contents of the documents, such as a document referred to in processing a task and a document generated in the process of processing the task are treated as related documents. Therefore, the utterance content of the speaker is also an example of the related document.

In order to increase the voice recognition rate for the speaker who utters in the process of task processing, a large number of vocabularies related to the utterance content may be collected. From this viewpoint, related documents may be acquired until the acquired related documents include utterance vocabularies the number of which exceeds a predetermined number (which will be referred to as a "prescribed number M" (M is a positive integer) among the vocabularies (referred to as "utterance vocabularies") included in the utterance content uttered by the speaker. The prescribed number M is an evaluation value used in quantitatively determining whether the number of vocabulary necessary for creating the dictionary has been obtained. For example, the prescribed number M is set in advance based on a preset ratio that defines the number of utterance vocabularies included in the extracted related document with respect to the number of utterance vocabularies. That is, the prescribed number M is an example of a set number according to the present exemplary embodiment.

Accordingly, when the number of utterance vocabularies included in the related document extracted by the extraction unit 13 is equal to or less than the prescribed number M, the setting unit 14 searches each task included in the task structure received by the receiver 11 according to a predetermined search order until the number of utterance vocabularies collected from related documents exceeds the prescribe number M and sets a task satisfying a predetermined condition as a task from which the extraction unit 13 extracts a related document next. When the number of utterance vocabularies included in the related document extracted by the extraction unit 13 exceeds the prescribed number M, the setting unit 14 does not set a task from which a related document is extracted next, and notifies the extraction unit 13 that extraction of a related document ends.

The predetermined condition used to extract the related document is an example of a matching condition according to the present exemplary embodiment, and will be hereinafter referred to as a "filter condition". A situation where the number of utterance vocabularies included in the related document extracted by the extraction unit 13 exceeds the prescribed number M refers to that the total number of utterance vocabularies included in an at least one extracted related document exceeds the prescribed number M.

When the extraction of related documents ends in the extraction unit 13, the collection unit 15 collects vocabularies not included in the utterance content of the speaker from each of the related documents extracted by the extraction unit 13 while referring to the temporary recognition result. The collected vocabularies are organized as a dictionary together with the vocabularies included in the temporary recognition result, and are associated with the task in execution as a voice recognition dictionary for the task in execution. The temporary recognition unit 12 may perform subsequent voice recognition using the dictionary associated with the task in execution, including the vocabularies collected by the collection unit 15.

Figure 3:
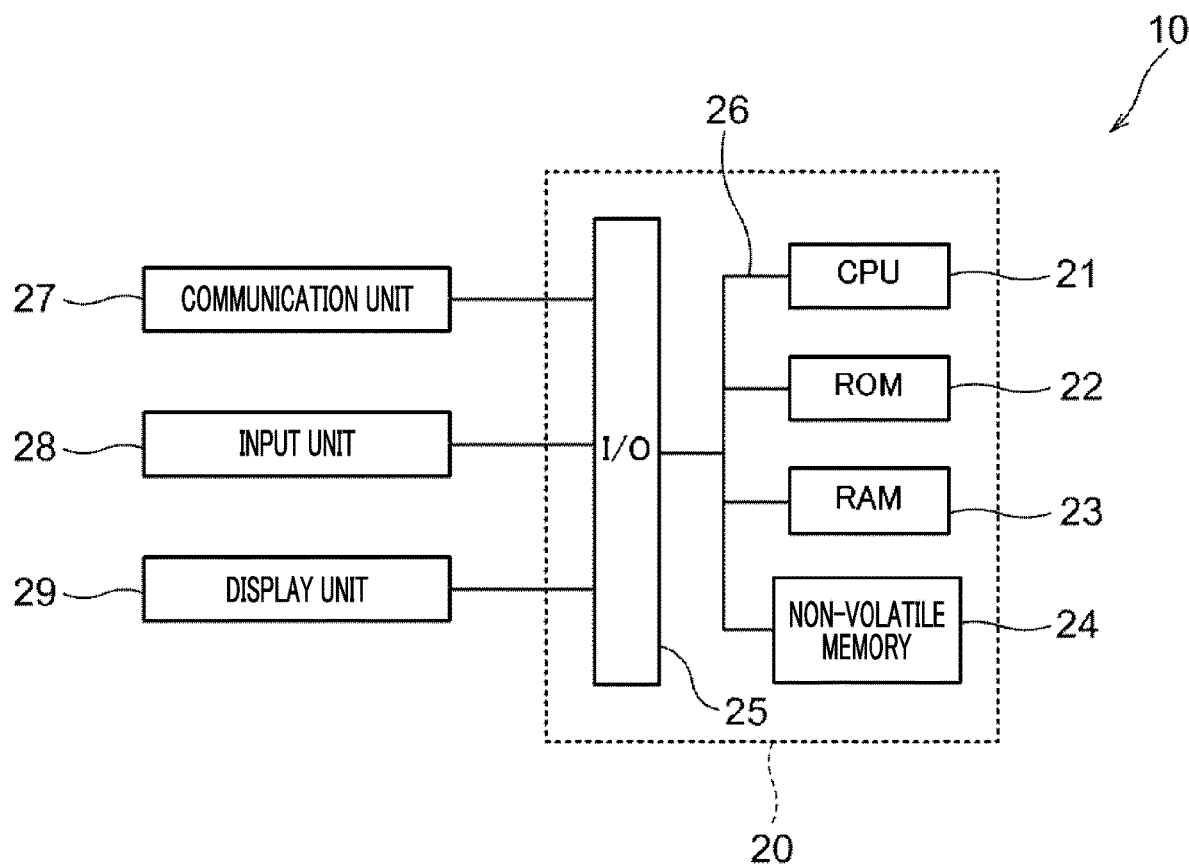
FIG. 3 is a diagram illustrating an example of a configuration of an electric system in the information processing apparatus.

FIG. 3 is a diagram illustrating an example of a configuration of an electric system in the information processing apparatus 10. The information processing apparatus 10 is implemented by, for example, a computer 20.

The computer 20 includes a central processing unit CPU 21 serving as respective elements of the information processing apparatus 10 according to the present exemplary embodiment illustrated in FIG. 1, a read only memory (ROM) 22 storing an information processing program, a random access memory (RAM) 23 used as a temporary working area of CPU 21, a non-volatile memory 24, and an input and output interface (I/O) 25. The CPU 21, the ROM 22, the RAM 23, the non-volatile memory 24, and the I/O 25 are connected to one another via a bus 26.

The non-volatile memory 24 is an example of a storage device that stores information even when power supplied to the non-volatile memory 24 is cut off. For example, a semiconductor memory is used as the non-volatile memory 24. Alternatively, a hard disk may be used as the non-volatile memory 24. The non-volatile memory 24 need not necessarily be built in the computer 20. A storage device removable from the computer 20 such as a memory card may be used as the non-volatile memory 24.

On the other hand, a communication unit 27, an input unit 28, and a display unit 29 are connected to the I/O 25, for example.

The communication unit 27 is connected to a communication line (not illustrated) and has a communication protocol for performing data communication with an external device (not illustrated) connected to the communication line (not illustrated). For example, the vocabularies and the dictionaries collected by the information processing apparatus 10 may be transmitted to an external device (not illustrated) through the communication unit 27.

The input unit 28 is an input device that receives an instruction from an operator of the information processing apparatus 10 and notifies the CPU 21 of the instruction. For example, a button, a keyboard, a mouse, and a touch panel are used as the input unit 28.

The display unit 29 is a display device that displays information processed by the CPU 21 in the form of an image. For example, a liquid crystal display or an organic electro luminescence (EL) display is used as the display unit 29.

Units connected to the I/O 25 are not limited to the units illustrated in FIG. 3. For example, a voice recognition unit that receives an instruction by voice or a printing unit that prints information on a recording medium such as paper may be connected to the I/O 25.

Next, the operation of the information processing apparatus 10 will be described with reference to FIG. 4.

Figure 4:
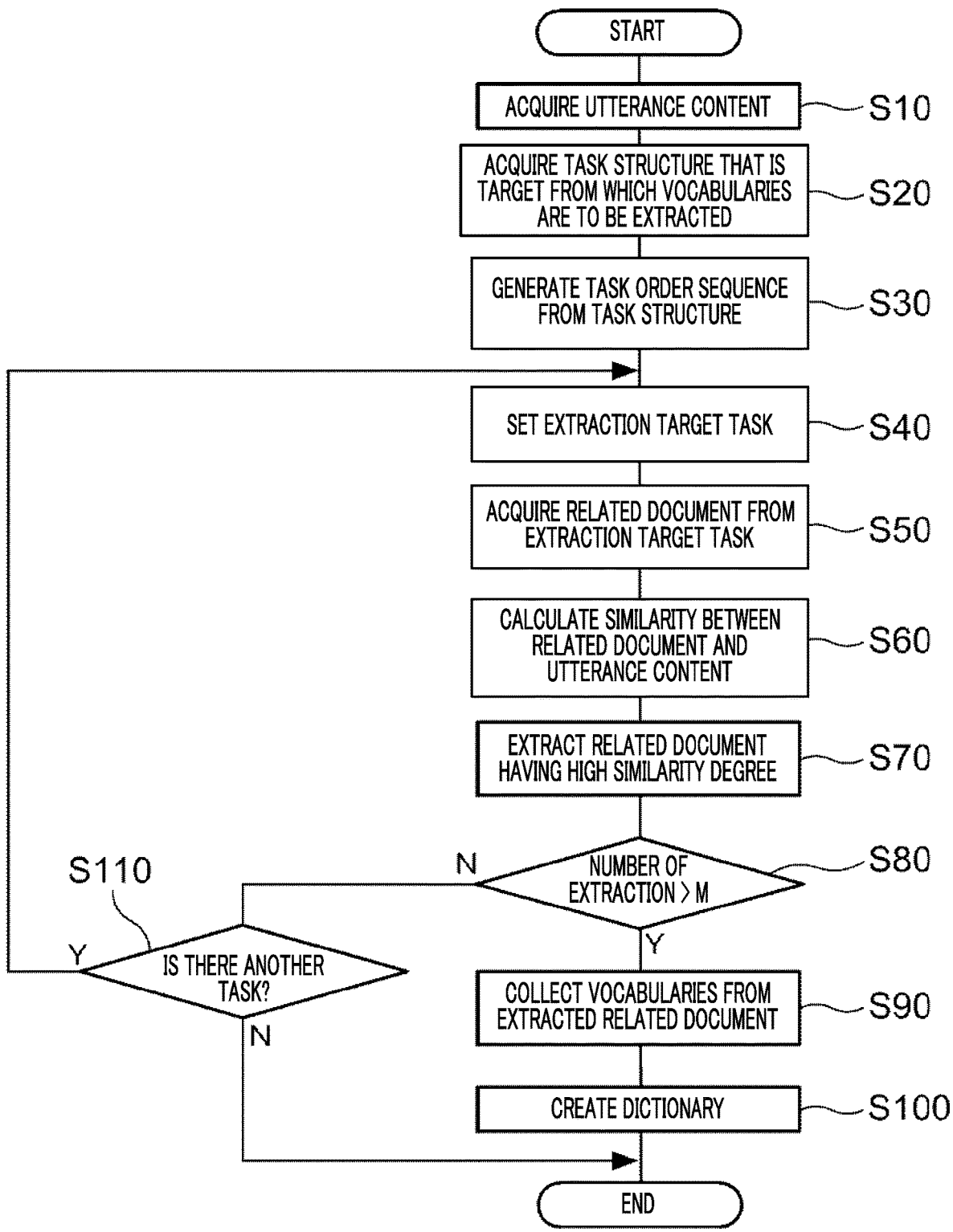
FIG. 4 is a flowchart illustrating an example of information processing.

FIG. 4 is a flowchart illustrating an example of information processing executed by the CPU 21 when voice data representing the utterance content of the speaker is received.

An information processing program that defines information processing is stored in advance in, for example, the ROM 22 of the information processing apparatus 10. The CPU 21 of the information processing apparatus 10 reads the information processing program stored in the ROM 22 and executes the information processing. It is assumed that in the information processing apparatus 10, as illustrated in FIG. 2 as an example, information representing the task structure of the work in execution is stored in advance in, for example, the non-volatile memory 24, and that the information processing apparatus 10 receives a task ID indicating a task in execution in the work in advance. As a matter of course, the information processing apparatus 10 may receive the task structure of the work in execution and the task ID indicating the task in execution, together with the voice data.

In step S10, the CPU 21 executes voice recognition on the received voice data using a voice recognition technique of a related art, and converts the voice data into characters to acquire the utterance content of the speaker. Examples of the voice recognition technique of the related art include a voice recognition technique using a voice recognition engine that is prepared by machine-learning using the deep learning technique. The CPU 21 stores the acquired utterance content in the RAM 23.

In step S20, the CPU 21 acquires, from the non-volatile memory 24, information representing the task structure of the work in execution.

In step S30, the CPU 21 generates a task order sequence representing a search order of related documents among tasks using the task structure of the work acquired in step S20. For example, a tree structure used to represent a data structure is used as a method of representing the task order sequence.

Figure 5:
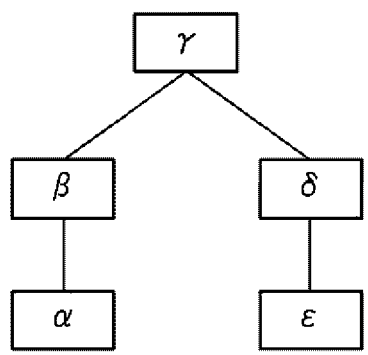
FIG. 5 is a diagram illustrating an example of a task order sequence.

FIG. 5 is a diagram illustrating an example of the task order sequence when the task structure illustrated in FIG. 2 is represented by a tree structure. The CPU 21 generates the task order sequence having the task in execution at a root.

In the example of FIG. 5, the task γ corresponding to the root is the task in execution. FIG. 5 illustrates the task order sequence that is generated paying attention to a connection relationship among the tasks when viewed from the task γ according to the task structure illustrated in FIG. 2. It should be noted that the task order sequence does not need to be generated according to the connection relationship among the tasks. For example, the task order sequence may be generated according to a scheduled task execution date and time (or an execution date and time for an already executed task) and a task importance.

When the workflow includes a flow that branches depending on a certain condition, the branch destination tasks are regarded as tasks at the same order. Therefore, the CPU 21 may process the branch destination tasks together as one task to generate a task order sequence.

In step S40, the CPU 21 sets, for the task order sequence generated in step S30, a task which is a target from which a related document is to be extracted in accordance with a predetermined search order. Hereinafter, the task set as a target from which a related document is to be extracted in step S40 may be referred to as an "extraction target task".

When setting the extraction target task for the first time for the task order sequence generated in step S30, the CPU 21 sets a task in execution at the root of the task order sequence as an extraction target task. This is because it is considered that vocabularies included in the utterance content that the speaker utters in the task in execution are more included in a related document associated with the task in execution than other tasks.

When it is necessary to set a task other than the task in execution as an extraction target task as described later, the CPU 21 sets a task, which is a target from which a related document is to be extracted, from the task in execution at the root of the task order sequence in accordance with the predetermined search order.

A search algorithm used in the tree structure is applied to the search order for searching the task order sequence to set the extraction target task. Examples of the search algorithm include the breadth-first search, the depth-first search, and the depth-first search. There are forward and reverse directions for each search algorithm.

The forward breadth-first search is a search algorithm that searches tasks in order while prioritizing a task which has a shallower depth from the root and a task which is located in a branch on the left side. In the case of the task order sequence illustrated in FIG. 5, the tasks are searched in the order of the task γ→the task β→the task δ→the task α→the task ε.

The reverse breadth-first search is a search algorithm that searches tasks in order while prioritizing a task which has a shallow depth from the root and a task which is located in a branch on the right side. In the case of the task order sequence illustrated in FIG. 5, the tasks are searched in the order of the task γ→the task δ→the task β→the task ε→the task α.

The forward depth-first search is a search algorism that searches the task in the branch on the left side of the root from a shallow task to a task at the end, and when reaching the end task, sequentially searches tasks in the adjacent branch on the right side of the searched branch from a shallow task to a task at the end. In the case of the task order sequence illustrated in FIG. 5, the tasks are searched in the order of the task γ→task the β→the task α→the task δ→the task ε.

The reverse depth-first search is a search algorithm that searches tasks in the branch on the right side of the root from a shallow task to a task at the end, and when reaching the end task, sequentially searches tasks in the adjacent branch on the left side of the searched branch from a shallow task to a task at the end. In the case of task order sequence illustrated in FIG. 5, the tasks are searched in the order of the task γ→the task δ→the task ε→the task β→the task α.

The forward distance depth-first search is a search algorithm that searches tasks in the branch on the left side of the root from the end task toward a shallow task, and if reaching a task adjacent to the task at the root, sequentially searches tasks in the adjacent branch on the right side of the searched branch from the end task toward a shallow task. In the case of task order sequence illustrated in FIG. 5, the tasks are searched in the order of the task γ→the task α→the task β→the task ε→the task δ.

The reverse distance depth-first search is a search algorithm that searches tasks in a branch on the right side of the root from the end task toward a shallow task, and if reaching a task adjacent to the task at the root, sequentially searches tasks in the adjacent branch on the left side of the searched branch from the end task toward a shallow task. In the case of task order sequence illustrated in FIG. 5, the tasks are searched in the order of the task γ→the task ε→the task δ→the task α→the task β.

However, among the tasks included in the task structure, there may be a task in which exchanged is a conversation having a content different from that of a conversation that is exchanged in the task in execution, that is, there may be a task having less relevancy to the task in execution. For example, it is assumed that the speaker in the task γ is Mr. A and that the staff member who is in charge of processing of the task γ after listening to the Mr. A's speech is B. In this case, if neither Mr. A nor Mr. B is involved in the task β, a related document of the task β is less likely to include vocabularies used in the conversation in the task γ than a related document of the task γ includes.

Therefore, in order to secure a degree of association between tasks, in the information processing apparatus 10, a filter condition defining a common attribute to the task in execution is set in advance and stored in the non-volatile memory 24. This is because (i) another task that has a common attribute to the task in execution is likely to be more relevant to the task in execution than other tasks that have no common attribute to the task in execution and (ii) a related document of the another task having the common attribute to the task in execution is likely to include vocabularies similar to those in the conversation exchanged in the task in execution.

Therefore, when setting the extraction target task according to the task order sequence, the CPU 21 sets a task satisfying the filter condition as the extraction target task.

As the filter condition, for example, a condition such as "a task in which the same speaker and the same person in charge as those in the task in execution are involved" is used. It should be noted that the content of the filter condition is not limited thereto. For example, a condition such as "a task in which the same speaker as that in the task in execution is involved" or "a task in which the same person in charge as that in the task in execution is involved" may be used. The person in charge of processing the task according to the utterance content of the speaker is an example of an involved person in the present exemplary embodiment.

In addition, for example, there is a difference between a conversation exchanged at a bank window and a conversation exchanged at a bank's conference room. Therefore, a place where a task is processed, such as "a task that is processed at the same place as the task in execution", may be set as a filter condition.

In step S50, the CPU 21 acquires each of the related documents associated with the extraction target task set in step S40 from the storage device in which the related documents are stored, and stores the acquired related documents in the RAM 23. The related documents may be stored in the non-volatile memory 24 of the information processing apparatus 10 or may be stored in an external device (not illustrated) different from the information processing apparatus 10. When the related documents are stored in an external device (not illustrated), the CPU 21 controls the communication unit 27 to acquire the related documents associated with the extraction target task from the external device (not illustrated) through the communication line (not illustrated).

In step S60, the CPU 21 calculates, for each related document, a similarity between the each related document acquired in step S50 and the utterance content of the speaker acquired in step S10.

A calculation technique of a related art is used to calculate the similarity between the each related document and the utterance content. For example, an utterance feature vector representing a feature of an utterance content and a sentence feature vector representing a feature of a sentence included in the each related document are generated, and a cosine similarity between the respective feature vectors is calculated. A score value representing the similarity between the each related document and the utterance content is calculated. The CPU 21 stores the calculated score value in the RAM 23 in association with the each related document. For the convenience of description, it is assumed that, as the score value indicating the similarity is higher, the utterance content and the related document are more similar to each other.

In step S70, the CPU 21 extracts, from among the related documents associated with the extraction target task, a related document whose score value is equal to or higher than the threshold value. The threshold value indicates the lower limit of a score value of a related document having a content which is considered to be related to the utterance content. For example, the threshold value is obtained in advance from an experiment in which the score value of the related document extracted when the utterance content of the sample is used and a similarity between the utterance content of the sample and the extracted related document are investigated.

As a result, among the related documents associated with the extraction target task, a related document having a higher similarity to the utterance content than other related documents is extracted. Hereinafter, the related document extracted in step S70 may be simply referred to as an "extracted related document".

In step S80, the CPU 21 determines whether the number of utterance vocabularies included in the extracted related document exceeds the prescribed number M.

When the number of utterance vocabularies included in the extracted related documents is equal to or less than the prescribed number M, since a dictionary having a target quality may not be generated, the vocabularies are collected from related documents associated with other tasks different from the task in execution in the task structure of the work in execution.

Therefore, when the number of utterance vocabularies included in the extracted related document is equal to or less than the prescribed number M, the process proceeds to step S110. In step S110, the CPU 21 determines whether or not there is another task which has not yet been searched in step S40 in the task structure of the work in execution.

When all the tasks included in the task structure of the work in execution have been searched, there is no remaining related document associated with the work in execution in each task included in the task structure. In this case, even if vocabularies are collected from related documents whose total number of included utterance vocabularies is less than or equal to the prescribed number M, since the dictionary having the target quality may not be generated, the information processing illustrated in FIG. 4 ends.

On the other hand, when there is another task that has not yet been searched in step S40 in the task structure of the work in execution, the process proceeds to step S40. In step S40, as described above, the task order sequence is searched according to the predetermined search order, and a task satisfying the filter condition is set as a next task which is a target from which a related document is to be extracted.

That is, the CPU 21 repeatedly executes the steps S40 to S80 and step S110 and extracts related documents each having a score value equal to or more than the threshold value, until extracting utterance vocabularies the number of which exceeds the prescribed number M from the related documents associated with the tasks included in the task structure of the work in execution or completing selection of all tasks satisfying the filter condition from the tasks included in the task structure of the work in execution.

On the other hand, when the CPU 21 determines in the determination process of step S80 that the number of utterance vocabularies included in the extracted related document exceeds the prescribed number M, the process proceeds to step S90.

In this case, since the related documents similar to the utterance content are obtained, the CPU 21 collects vocabularies from each of the extracted related documents in step S90. The vocabularies included in the utterance content acquired in step S10 are vocabularies which are already included in the dictionary used in the voice recognition for acquiring the utterance content of the speaker. Therefore, the CPU 21 may collect, from each of the extracted related documents, vocabularies which are not included in the utterance content acquired in step S10.

In step S100, the CPU 21 uses the respective vocabularies collected in step S90 to create a dictionary that is used in performing the voice recognition of the speaker in the task in execution.

Specifically, in step S90, when the vocabularies not included in the utterance content acquired in step S10 are collected from each of the extracted related documents, a dictionary is generated by adding the vocabularies collected in step S90 to the dictionary used in the voice recognition in step S10, for example. As described above, the information processing illustrated in FIG. 4 ends.

In the information processing illustrated in FIG. 4, when it is determined in the determination processing of step S110 that all tasks included in the task structure of the work in execution have already been searched, the information processing ends. Alternatively, even if the number of utterance vocabularies included in the extracted related documents is equal to or less than the prescribed number M, the process proceeds to step S90, and the vocabularies may be collected from each of the extracted related documents to create the dictionary. In this case, a dictionary having the target quality may not be generated. However, since new vocabularies are added to the dictionary, the number of vocabularies registered in the dictionary increases.

The related document having the score value equal to or higher than the threshold value is extracted in step S70 of FIG. 4. The determination method for extracting the related document having a sentence similar to the utterance content is not limited thereto. For example, the predetermined number of related documents may be extracted in order from the document having the highest score value. Alternatively, related documents may be extracted from the related documents associated with the task in order from the related document having the highest score value until a ratio of the number of extracted related documents to the number of related documents associated with the task reaches a predetermined ratio.

The example in which "a task in which both the same speaker and the same person in charge as those in the task in execution are involved" is used as an example of the filter condition used for selecting the task has been described. Each of the speaker and the person in charge is not limited to one person. Therefore, at least one of the speaker or the person in charge may be defined as plural persons. In this case, a task in which at least one member of the speaker and the person in charge is the same member as the task in execution is selected as a task related to the task in execution.

Furthermore, for example, when there are plural speakers, the speakers are ordered in order from the speaker having the largest number of utterances. Even if a task involves the same speakers as the task in execution involves, when the orders of the speakers ordered based on the number of utterances are different, it may be determined that the filter condition is not satisfied. Such orders may be set for the persons in charge. For example, persons in charge may be ordered according to degrees of involvement in the processing of tasks, such as a primary person in charge and a secondary person in charge. Even if the persons in charge in a task are the same as those in the task in execution, when the order of the persons in charge who are ordered according to the degrees of involvement in the processing of the task is different, it may be determined that the filter condition is not satisfied.

Furthermore, each time step S80 is performed, the evaluation value used in step S80 of FIG. 4 may be set again according to the similarity between the utterance content of the speaker and the extracted related document, that is, the score value of the extracted related document.

For example, it is assumed in step S70 that the threshold value for the score value used to extract the related document is set to "50", and that the prescribed number M of utterance vocabularies is set to "99". In this case, if 100 utterance vocabularies are collected from the related documents each having a score value of "50", a dictionary having the target quality is generated. Therefore, in simple comparison, a dictionary having the same quality as that of the dictionary generated from the related documents having the score value of "50" and 100 utterance vocabularies is generated from related documents having a score value "100" corresponding to twice the similarity to the utterance content of the speaker and 50 utterance vocabularies.

Therefore, if the score value of the extracted related document is different, the prescribed number M may be set to a different value according to the score value. Specifically, reference values are set for the prescribed number M of utterance vocabularies included in the related document and the score value of the related document, respectively. When the score value of the extracted related document is larger than the reference value, the prescribed number M may be set to be smaller than the reference value as the difference between the reference value and the score value increases. Conversely, when the score value of the extracted related document is smaller than the reference value, the prescribed number M may be set to be larger than the reference value as the difference between the reference value and the score value increases.

As described above, the prescribed number M of the utterance vocabularies is set based on the ratio of the number of utterance vocabularies included in the extracted related document to the number of vocabularies included in the utterance content of the speaker. Therefore, the ratio of the number of utterance vocabularies may be used instead of the prescribed number M of utterance vocabularies as a determination criterion of step S80. In this case, when the score value of the extracted related document is larger than the reference value, the ratio of the number of utterance vocabularies may be set to be smaller than the reference ratio as the difference between the reference value and the score value increases. Conversely, when the score value of the extracted related document is smaller than the reference value, the ratio of the number of utterance vocabularies may be set to be larger than the reference ratio as the difference between the reference value and the score value increases.

In step S110, even when there is another task not yet searched in step S40 in the task structure of the work in execution, if the number of times a task from which a related document is to be extracted is changed exceeds a predetermined number, it may be determined that there is no more task from which a related document is to be extracted. Setting an upper limit value to the number of times a task is changed to another task prevents, for example, the following phenomenon, that is, when the number of utterance vocabularies included in the extracted related document is equal to or less than the prescribed number M and when the number of tasks included in the task structure is equal to or more than a predetermined number, the search for a task from which a related document is to be extracted is continued indefinitely, and the processing of the information processing apparatus 10 takes a long time.

As described above, with the information processing apparatus 10 according to the present exemplary embodiment, when the number of utterance vocabularies included in the related documents extracted from the respective tasks included in the workflow represented by the task structure is less than or equal to the prescribed number M, the tasks are searched according to the predetermined search rule. Then, when finding a task that satisfies the filter condition that defines the common attribute to the task in execution, the information processing apparatus 10 extracts a related document having a score value equal to or higher than the threshold value from the related documents associated with the task satisfying the filter condition and collects the vocabularies from the extracted related document to create a dictionary.

That is, even when the number of utterance vocabularies included in the related document extracted from the task in execution is equal to or less than the prescribed number M, the information processing apparatus 10 extracts related documents having a score value equal to or higher than the threshold value while expanding the extraction range of related documents up to tasks related to the task in execution. Therefore, the vocabularies similar to the utterance content are efficiently collected.

Modification Example 1 of Exemplary Embodiment

In the information processing apparatus 10 according to the first exemplary embodiment, the task satisfying the filter condition set in advance is set as the extraction target task from the task structure of the work in execution. However, in some situations, for example, there is no task that satisfies the filter condition but the task in execution, and the number of utterance vocabularies included in the extracted related document does not exceed the prescribed number M.

In such a case, if the filter condition is changed, there may be a task that does not satisfy the original filter condition but satisfies the changed filter condition, and the number of utterance vocabularies included in the extracted related document may exceed the prescribed number M.

In Modification Example 1 of the exemplary embodiment, the information processing apparatus 10 that changes the extraction range of related documents so that the number of utterance vocabularies included in the extracted related documents exceeds the prescribed number M, by changing the filter condition when the number of utterance vocabularies included in the related document extracted based on the original filter condition is less than or equal to the prescribed number M will be described.

Figure 6:
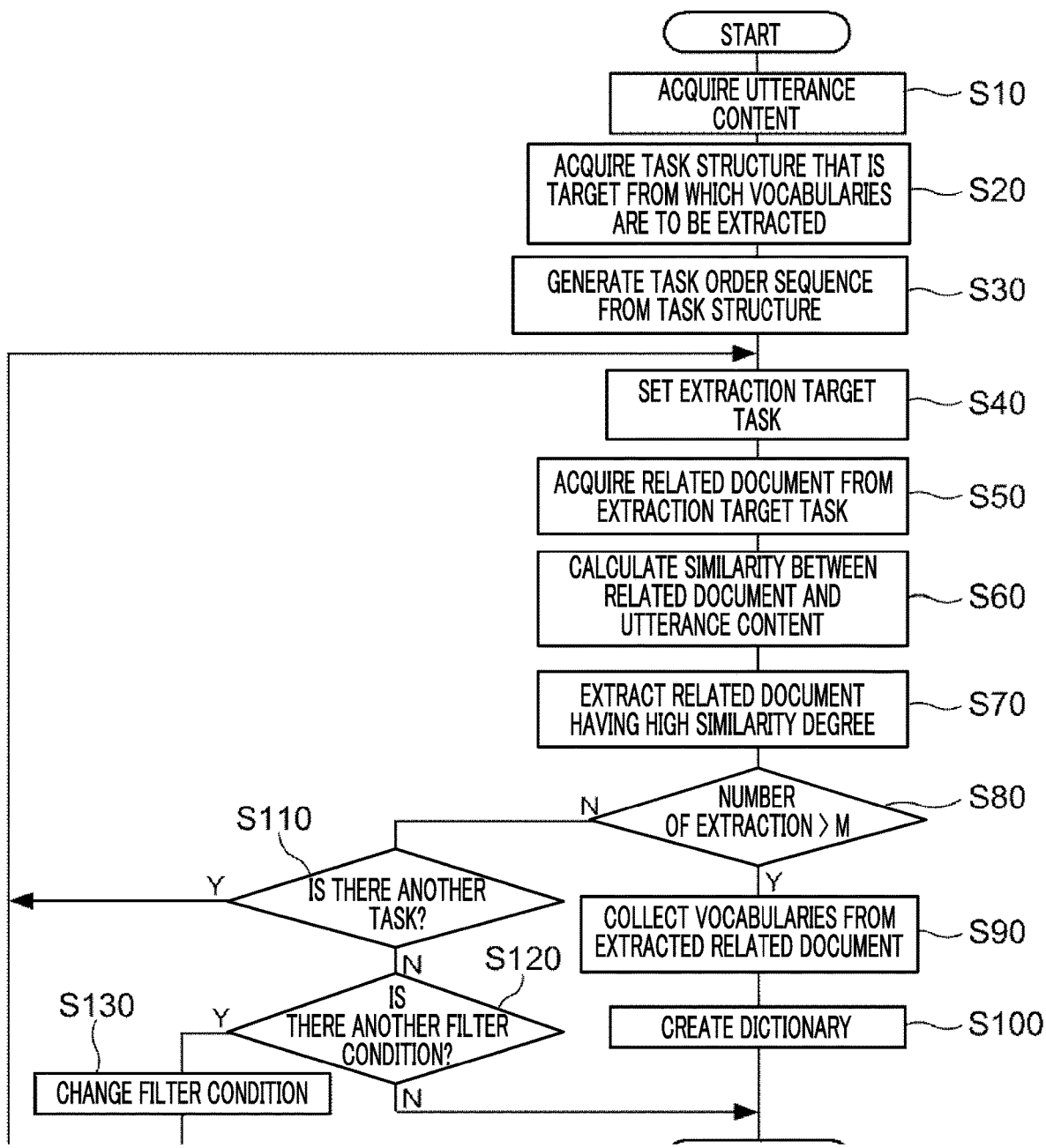
FIG. 6 is a flowchart illustrating an example of information processing in Modification Example 1.

FIG. 6 is a flowchart illustrating an example of information processing executed by the CPU 21 in the present modification example. The information processing illustrated in FIG. 6 differs from the information processing illustrated in FIG. 4 in that steps S120 and S130 are added, and the other processing is the same as in FIG. 4. Therefore, hereinafter, the information processing illustrated in FIG. 6 will be described focusing on steps S120 and S130.

If it is determined in the determination process of step S110 that all tasks included in the task structure of the work in execution have already been searched, step S120 is performed.

In this case, the number of utterance vocabularies included in the related document extracted in step S70 is less than or equal to the prescribed number M, and any other task satisfying the currently set filter condition is not included in the task structure of the work in execution. Therefore, the CPU 21 attempts to set another filter condition different from the currently set filter condition.

Figure 7:
FIG. 7 is a diagram illustrating an example of a filter condition table.

FIG. 7 is a diagram illustrating an example of the filter condition table 16 in which plural filter conditions are described.

The filter condition table 16 is, for example, a table in which priorities and filter conditions are associated with each other. The filter condition table 16 is stored, for example, in the non-volatile memory 24 in advance.

The priorities in the filter condition table 16 are values indicating the order of filter conditions used in extracting a task from the task structure. In the example of FIG. 7, the smaller the priority value is, the higher the priority is, that is, the more preferentially the filter condition is adopted.

Specifically, in the case of the filter condition table 16 of FIG. 7, the filter condition is adopted in the following order, that is, first, "a task in which the same speaker and the same person in charge as those in the task in execution are involved", second, "a task in which the same speaker as that in the task in execution is involved", and third, "a task in which the same person in charge as that in the task in execution is involved".

Therefore, in step S120, the CPU 21 refers to the filter condition table 16 to determine whether there is an unselected filter condition that has not been used as a filter condition.

If all filter conditions have been adopted, there is no more task which is a target from which a related document is to be extracted. In this case, even if vocabularies are collected from related documents whose total number of included utterance vocabularies is less than or equal to a prescribed number M, a dictionary having the target quality may not be generated. Therefore, the information processing illustrated in FIG. 6 ends.

On the other hand, when there is an unselected filter condition in the filter condition table 16, the process proceeds to step S130.

In this case, by changing the filter condition used in extracting the task from the task structure to the unselected filter condition, a new extraction target task which has not been set based on the filter condition before the change is set from the task structure of the work in execution. That is, an extraction range different from the extraction range of the related documents in the filter condition before the change is set.

Therefore, in step S130, the CPU 21 sets an unselected filter condition as a new filter condition in accordance with the priorities of the filter condition table 16, and proceeds to step S40.

Thereafter, until the number of utterance vocabularies included in the extracted related documents exceeds the prescribed number M, or until there is no unselected filter condition in the filter condition table 16, the processing in the steps S40 to S80 and steps S110 to S130 are repeated. Thereby, a related document having a score value equal to or more than the threshold value is extracted from the related documents associated with the task satisfying the changed filter condition. In a case where the task satisfying the filter condition before the change and the task satisfying the filter condition after the change are the same task, the CPU 21 prevents a related document from being extracted redundantly from the same task by not setting the extraction target task even if the task satisfies the changed filter condition. Accordingly, the information processing illustrated in FIG. 6 ends.

In the filter condition table 16 illustrated in FIG. 7, for example, words expected to be uttered by the speaker may be defined and the task associated with the related document including the defined words may be set as the extraction target task. In addition, in the filter condition table 16 illustrated in FIG. 7, for example, a part of a name used for a task that is expected to be associated with a related document whose score value is equal to or higher than the threshold value may be defined, and a task including the defined name may be set as the extraction target task.

However, it is difficult to predict in advance what content the speaker speaks. Also, since the task structure changes depending on the workflow, task names included in the task structure also change. Therefore, attributes relating to the speaker and the person in charge, such as an age and a gender may be defined as a filter condition, rather than the utterance content of the speaker. When a task related to the task in execution is determined in advance, a task name of a task which is to be an extraction target task may be set in the filter condition.

In step S120, even when there is an unselected filter condition in the filter condition table 16, if the number of times the filter condition is changed exceeds a predetermined number, it may be deemed that there is no more task satisfying the changed filter condition, and it may be determined that all the filter conditions have been adopted even though there is still an unselected filter condition. Setting an upper limit value to the number of times the filter condition is changed prevents, for example, the following phenomenon, that is, when the number of utterance vocabularies included in the extracted related document is equal to or less than the prescribed number M, the filter condition is changed indefinitely and the processing of the information processing apparatus 10 takes a long time.

As described above, with the information processing apparatus 10 according to the present exemplary embodiment, when the number of utterance vocabularies included in the related document extracted from the task included in the task structure of the work in execution is equal to or less than the prescribed number M, the filter condition is changed in accordance with the priorities, and a related document having a score value equal to or more than the threshold value is extracted from related documents associated with a new task that satisfies the changed filter condition. That is, without limiting the extraction range of the related document to a predetermined range, the related document having a score value equal to or higher than the threshold value is extracted while changing the extraction range of the related document according to the situation.

Modification Example 2 of Exemplary Embodiment

In Modification Example 1 of the exemplary embodiment, the example of expanding the extraction range of the related document has been described. That is, when the number of utterance vocabularies included in the related document extracted using the preset filter condition is equal to or less than the prescribed number M, the filter condition is changed according to the priorities to extract the related document. However, depending on the situation, even if the filter condition is changed, the number of utterance vocabularies included in the related document extracted may be still equal to or less than the prescribed number M.

In this case, if another case in the same work as the work in execution is set as a new target from which related documents are to be detected, a task satisfying the filter condition is detected from the task structure in the another case, and the number of utterance vocabularies included in the extracted related document may exceed the prescribed number M.

Here, "another case in the same work as the work in execution" is another case that is in the same work as the work defined by the received task structure and that is different from the case in which the utterance content represented by the received voice data is uttered.

For example, in the case of the loan business in a bank, there are various loan cases other than the loan case where the utterance content represented by the voice data is issued. Therefore, the same conversation as the utterance content represented by the voice data may be exchanged in another loan case. The utterance content is also associated with the task as a related document of the task in which the utterance is made. Therefore, vocabularies that a speaker more tends to use may be obtained by extracting a related document from related documents associated with a task of another case in the same work as the work in execution, than by extracting a related document from the work in execution from which a related document whose score value is equal to or larger than the threshold value is no longer extracted even if the filter condition is changed.

In Modification Example 2 of the exemplary embodiment, the information processing apparatus 10 will be described that changes the extraction range of related documents so that the number of utterance vocabularies included in an extracted related document exceeds the prescribed number M, by extracting the related document from related documents associated with a task of another case that is in the same work as the work in execution.

Figure 8:
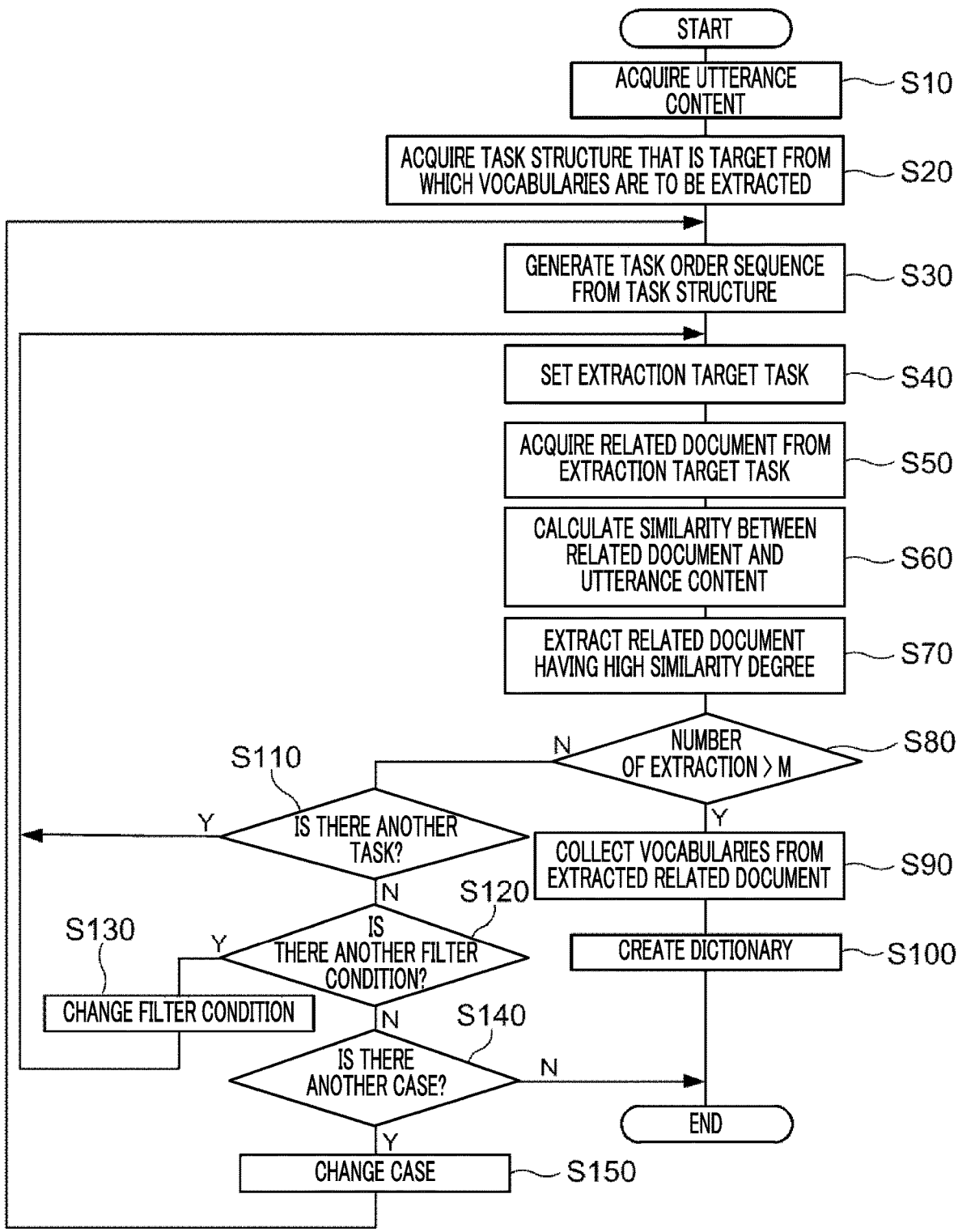
FIG. 8 is a flowchart illustrating an example of information processing in Modification Example 2.

FIG. 8 is a flowchart illustrating an example of information processing executed by the CPU 21 in the present modification example. The information processing illustrated in FIG. 8 differs from the information processing illustrated in FIG. 6 in that steps S140 and S150 are added, and the other processing is the same as in FIG. 6. Therefore, hereinafter, the information processing illustrated in FIG. 8 will be described focusing on steps S140 and S150.

If it is determined in the determination process of step S120 that all filter conditions defined in the filter condition table 16 have been adopted, step S140 is executed.

In step S140, the CPU 21 determines whether another case that has not yet been set in step S150 (described later) as a target from which a related document to be extracted and that is in the same work as in the work in execution is present in a storage device that stores respective cases of each work. The storage device may be the non-volatile memory 24 or a storage device of an external device (not illustrated) different from the information processing apparatus 10.

Figure 9:
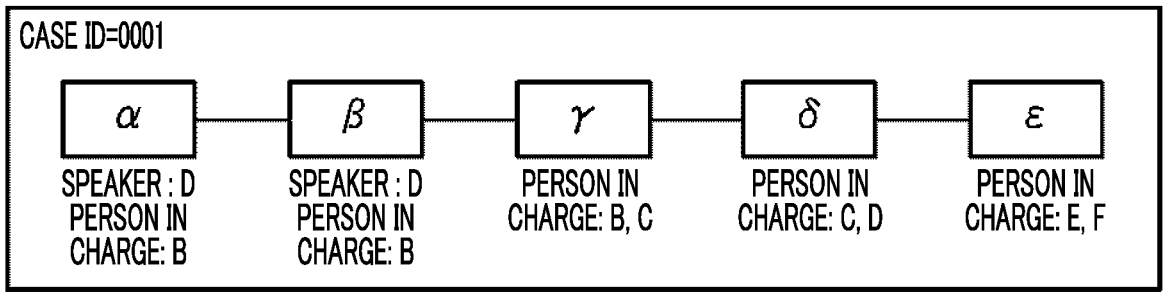
FIG. 9 is a diagram illustrating an example of another case in the work.
Figure 9:
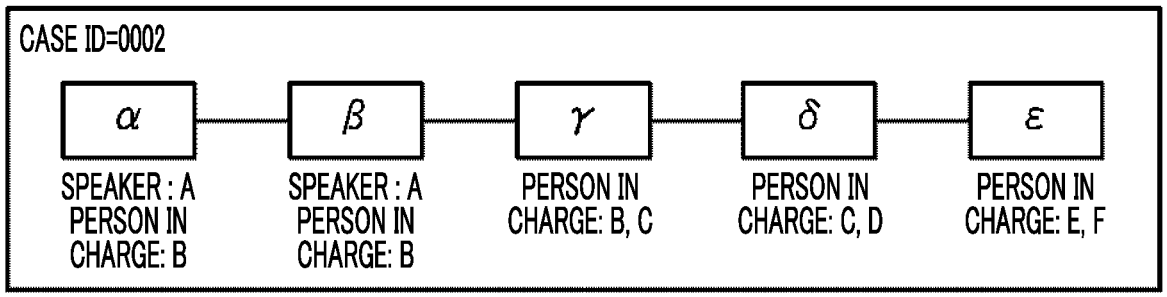
Figure 9:
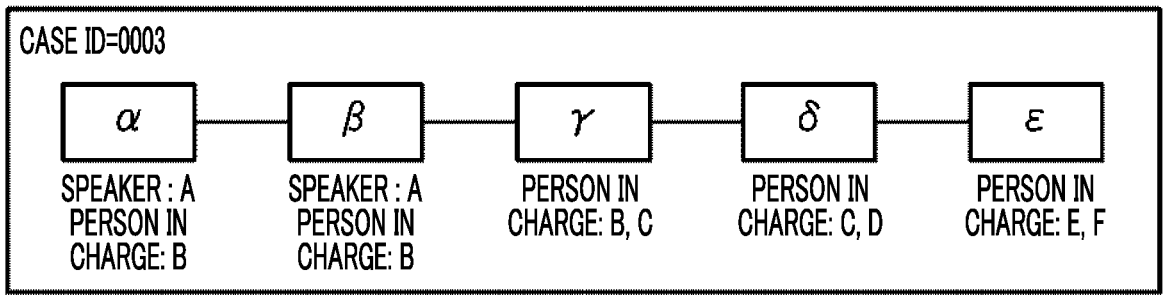
Figure 9:
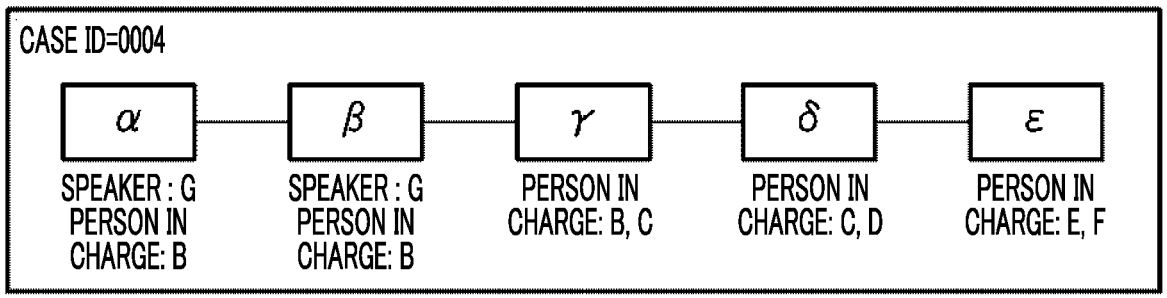
Figure 9:
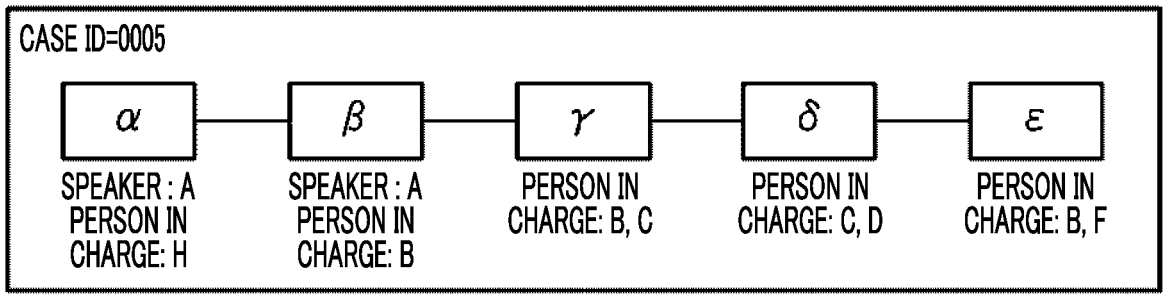

FIG. 9 is a diagram illustrating an example of the another case in the same work as the work represented by the task structure illustrated in FIG. 2.

Each case is assigned with a case ID that uniquely represents the case. As a difference between a case ID in interest and the case ID of the case which is the target from which a related document is to be extracted (hereinafter, referred to as the "case in execution") increases, the occurrence time of a case corresponding to the case ID in interest is far from that of the case in execution. That is, the smaller the difference between the case IDs, the shorter the interval from the occurrence time at which the case in execution has occurred is.

In FIG. 9, for example, a case having a case ID represented by "0002" is set as a case in execution, and a task β is set as a task in execution.

When determining whether there is another case, the CPU 21 does not merely determine whether there is a case other than the case in execution, but determines whether there is a case that includes a task having the same process as the task in execution and that is a case in which the task having the same process as the task in execution has the same attribute as the task in execution. That is, the CPU 21 determines that another case exists when the another case includes a task having the same process as the task in execution and when the task has the same attribute as the task in execution. Whether or not a task having the same process as the task in execution is included may be determined, for example, based on whether or not a task having the same name as the task in execution is included.

There is no restriction on the setting of the attribute of the task in execution used to determine whether or not there is another case. An attribute related to the speaker, for example, an attribute that the speaker is the same, may be set. This is because when the speaker is the same in both cases, it is easier to collect vocabularies that are more likely to be used by the speaker than when the speakers in both cases are different from each other.

In the example of FIG. 9, the speaker of the task β in the case having the case ID represented by "0003" and the speaker of the task β in the case having the case ID represented by "0005" are the same "speaker A" as the speaker of the task β in the case in execution. Therefore, the CPU 21 determines that there is another case in the same work as the work in execution, and proceeds to step S150.

In step S150, the CPU 21 sets the another case whose existence has been confirmed in step S140 as a new target from which a related document is to be extracted, and proceeds to step S30. As in the example illustrated in FIG. 9, when there are plural other cases, the CPU 21 sets any one of the other cases as a new target case from which a related document is to be extracted. In this case, the CPU 21 sets the plural other cases in order as a new target case from which a related document is to be extracted, from the case which has the shortest interval from the occurrence time of the case in execution among the plural other cases.

In step S30, a task order sequence is generated from the task structure of the new case set in step S150. Therefore, the CPU 21 performs steps S30 to S80 and steps S110 to S150 until the number of utterance vocabularies included in the extracted related documents exceeds the prescribed number M or there are no other cases in the same work as the work in execution. By repeating the steps, a related document having a score value equal to or more than the threshold value is extracted from the related documents associated with the task satisfying the filter condition among the tasks included in the another case. When the target case from which a related document is to be extracted is changed, all filter conditions in the filter condition table 16 are set again to be unselected, and the filter condition is selected in order from the filter condition whose priority is "1".

On the other hand, when it is determined in the determination process of step S140 that there is no other case in the same work as the work in execution, utterance vocabularies the number of which is more than the prescribed number M are not collected even if reference is made to the related document associated with the task included in the another case. Therefore, the information processing illustrated in FIG. 8 ends.

In step S140, even when there is another case that has not yet been set as a target from which a related document is to be extracted, if the number of times the target from which a related document is to be extracted is changed to another case exceeds the predetermined number of times, it may be determined that there is no more case from which a related document is to be extracted. Setting an upper limit value to the number of times a case is changed to another case prevents, for example, the following phenomenon, that is, when the number of utterance vocabulary included in the extracted related document does not exceed the prescribed number M, a case from which a related document is to be extracted is changed indefinitely, and the processing of the information processing apparatus 10 takes a long time.

In this modification example, another case in the same work as the work in execution is set as a target from which a related document is to be extracted. However, the another case does not need to be a case in the same work as the work in execution.

The vocabularies used by the speaker in a specific task show the same tendency for the same task even if the type of work is different. The tendency becomes stronger if the speaker is the same. Therefore, even when a work is different from the work in execution, if the task structure of the work includes the same task name as the task in execution, a case in the work may be set as a target from which a related document is to be extracted.

In addition, in step S80 in FIGS. 4, 6, and 8, it is determined whether the number of utterance vocabularies included in the extracted related documents exceeds the prescribed number M. Alternatively, it may be determined whether the number of related documents extracted exceeds a prescribed number L.

The present disclosure has been described above using the exemplary embodiment. It should be noted that the present disclosure is not limited to the scope described in the exemplary embodiment. Various changes or modifications may be made to the exemplary embodiment without departing from the scope of the present disclosure. A mode obtained by making the changes or modifications is also covered by the technical scope of the present disclosure. For example, the order of processing may be changed without departing from the scope of the present disclosure.

In the exemplary embodiment, the information processing is implemented by software as an example. However, processing equivalent to that of the flowchart illustrated in FIGS. 4, 6, and 8 may be implemented by, for example, an application specific integrated circuit (ASIC) and processed by hardware. In this case, the processing speed can be increased as compared with the case where the information processing is implemented by software.

In the exemplary embodiment, the information processing program is installed in the ROM 22. It should be noted that the present disclosure is not limited thereto. The information processing program according to the present disclosure may also be provided in a form that the information processing program is recorded in a non-transitory computer readable medium. For example, the information processing program according to the present disclosure may be provided in a form that the information processing program is recorded on an optical disc such as a compact disc (CD)-ROM or a digital versatile disc (DVD)-ROM. Alternatively, the information processing program according to the present disclosure may be provided in a form that the information processing program is recorded in a semiconductor memory such as a universal serial bus (USB) memory or a flash memory. Further alternatively, the information processing program according to the present disclosure may be acquired from an external device (not illustrated) connected to the communication line (not illustrated) via the communication unit 27.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor programed to
        convert voice data of a speaker to an utterance content based on machine-learning;
        receive, from a memory, a processing structure of a work during which the speaker utters, the work including a plurality of processing units, the plurality of processing units including a processing unit in execution;
        extract a related document including a sentence having a similarity to the utterance content of the speaker greater than or equal to a threshold value, from among a plurality of related documents that are associated in advance with at least the processing unit in execution;
        when the number of vocabularies included in the related document extracted by the processor is less than or equal to a vocabulary threshold that is set for the number of vocabularies included in the utterance content of the speaker, repeat a setting of a subsequent processing unit of the plurality of processing units from which the processor will extract a related document, according to the received processing structure until (i) the number of vocabularies included in the related document extracted by the processor is greater than the vocabulary threshold or (ii) a number of times the subsequent processing unit is changed exceeds a predetermined number of times;

collect vocabularies from each related document extracted by the processor and organize the collected vocabularies to generate a voice recognition dictionary associated with the processing unit in execution; and convert voice data subsequently received during the processing unit in execution using the generated voice recognition dictionary.

2. The information processing apparatus according to claim 1, wherein the processor sequentially selects the processing units according to the processing structure until a processing unit satisfying a matching condition that defines a common attribute to the processing unit in execution is detected, and sets the processing unit satisfying the matching condition as the subsequent processing unit.

3. The information processing apparatus according to claim 2, wherein the matching condition is defined to be the same as at least one of the speaker who utters in the processing unit in execution or a person involved in processing of the processing unit in execution.

4. The information processing apparatus according to claim 3, wherein at least one of the speaker or the involved person who are defined in the matching condition is further defined as plural persons.

5. The information processing apparatus according to claim 2, wherein when the number of vocabularies included in the related document extracted by the processor from the related document associated with the processing unit satisfying the matching condition is equal to or less than the vocabulary threshold, the processor sequentially selects the processing units according to the processing structure, and sets a processing unit that satisfies a changed matching condition having a changed definition content as the subsequent processing unit.

6. The information processing apparatus according to claim 5, wherein when the number of times the matching condition is changed exceeds a predetermined number, the processor sets that there is no processing unit that satisfies the changed matching condition in the processing structure.

7. The information processing apparatus according to claim 5, wherein when the number of vocabularies included in each of extracted related documents including a related document extracted from related documents associated with the processing unit satisfying the changed matching condition by the processor is equal to or less than the vocabulary threshold, the processor sets another case in the same work as a work represented by the processing structure including the processing unit in execution as a new target from which a related document is to be detected.

8. The information processing apparatus according to claim 7, wherein the processor sets a case as the new target from which a related document is to be extracted in order from a case having the shortest interval from an occurrence time of a target from which a related document is to be extracted among the other cases associated with a record uttered by the speaker.

9. The information processing apparatus according to claim 7, wherein when the number of times of change to the other case, the other case being a new detection target of the processing unit satisfying the matching condition exceeds a predetermined number of times, the processor does not set a new detection target of the processing unit satisfying the matching condition.

10. The information processing apparatus according to claim 1, wherein the processor sets the vocabulary threshold according to the similarity between the utterance content of the speaker and the related document extracted by the processor.

11. The information processing apparatus according to claim 10, wherein the processor sets the vocabulary threshold such that the vocabulary threshold decreases as the similarity between the utterance content of the speaker and the related document extracted by the processor increases.

12. A non-transitory computer readable medium storing a program that causes a computer including a processor to execute information processing, the information processing comprising:

converting, using the processor, voice data of a speaker to an utterance content based on machine learning;

receiving, from a memory, a processing structure of a work during which the speaker utters, the work including a plurality of processing units, the plurality of processing units including a processing unit in execution;

extracting, using the processor, a related document including a sentence having a similarity to the received utterance content of the speaker greater than or equal to a threshold value, from among a plurality of related documents that are associated in advance with at least the processing unit in execution; and when the number of vocabularies included in the extracted related document is less than or equal to a vocabulary threshold that is set for the number of vocabularies included in the utterance content of the speaker, repeating, using the processor, a setting of a subsequent processing unit of the plurality of processing units from which a related document will be extracted, according to the received processing structure until (i) the number of vocabularies included in the related document extracted by the processor is greater than the vocabulary threshold or (ii) a number of times the subsequent processing unit is changed exceeds a predetermined number of times;

collecting, using the processor, vocabularies from each extracted related document and organizing, using the processor, the collected vocabularies to generate a voice recognition dictionary associated with the processing unit in execution; and converting, using the processor, voice data subsequently received during the processing unit in execution using the generated voice recognition dictionary.

13. An information processing apparatus comprising:

first converting means for converting voice data of a speaker to an utterance content based on machine learning;

reception means for receiving, from a memory,
a processing structure of a work during which the speaker utters, the work including a plurality of processing units, the plurality of processing units including a processing unit in execution;

extraction means for extracting a related document including a sentence having a similarity to the utterance content of the speaker received by the reception means greater than or equal to a threshold value, from among a plurality of related documents that are associated in advance with at least the processing unit in execution;

setting means for, when the number of vocabularies included in the related document extracted by the extraction means is less than or equal to a vocabulary threshold that is set for the number of vocabularies included in the utterance content of the speaker, repeating a setting of a subsequent processing unit of the plurality of processing units from which the extraction means will extract a related document, according to the processing structure received by the reception means until (i) the number of vocabularies included in the related document extracted by the extraction means is greater than the vocabulary threshold or (ii) a number of times the subsequent processing unit is changed exceeds a predetermined number of times;

collecting means for collecting vocabularies from each related document extracted by the extraction means and organizing the collected vocabularies to generate a voice recognition dictionary associated with the processing unit in execution; and second converting means for converting voice data subsequently received during the processing unit in execution using the generated voice recognition dictionary.

* * * * *